United States Patent [19]

Henriksson

[11] Patent Number: 5,294,074
[45] Date of Patent: Mar. 15, 1994

[54] LINE-PROTECTING ELEMENT FOR USE IN A FISHING REEL

[75] Inventor: Bengt-Ake Henriksson, Svängsta, Sweden

[73] Assignee: ABU Garcia Produktion AB, Svängsta, Sweden

[21] Appl. No.: 848,462

[22] Filed: Mar. 9, 1992

[51] Int. Cl.$^5$ ............................................. A01K 89/01
[52] U.S. Cl. ................................................... 242/319
[58] Field of Search .......................................... 242/319

[56] References Cited

U.S. PATENT DOCUMENTS

| | | | |
|---|---|---|---|
| 2,884,211 | 4/1959 | Holahan, Jr. | 242/319 |
| 3,381,914 | 5/1968 | Taggart | 242/319 X |
| 4,058,269 | 11/1977 | Nurmse | 242/319 |
| 4,061,288 | 12/1977 | Karlsson et al. | 242/319 |
| 4,451,012 | 5/1984 | Puryear et al. | 242/319 |
| 4,805,849 | 2/1989 | Nanbu | 242/319 |

Primary Examiner—Daniel P. Stodola
Assistant Examiner—Michael R. Mansen
Attorney, Agent, or Firm—Browdy and Neimark

[57] ABSTRACT

A line-protecting element for use in a fishing reel having a line spool with at least one circular end wall, and a component with a circular-cylindrical surface enclosing the end wall at a radial distance therefrom, is to be mounted on the end wall to bridge the distance between this wall and the enclosing surface in order, when using the fishing reel, to prevent a line wound on the line spool from being wedged between the end wall and the enclosing surface. The line-protecting element consists of a ring of low-friction material having substantially radially projecting tongues distributed along the circumference of the ring. The tongues are so dimensioned as to be easily flexible in the circumferential direction of the ring, but rigid in its axial direction. The outer radius of the ring is smaller than the radius of the enclosing surface, whereas the radius at the free ends of the tongues is greater than the radius of the enclosing surface.

5 Claims, 2 Drawing Sheets

LINE-PROTECTING ELEMENT FOR USE IN A FISHING REEL

BACKGROUND OF THE INVENTION

The present invention relates to a line-protecting element for use in a fishing reel having a line spool with at least one circular end wall, and a component with a circular-cylindrical surface enclosing said end wall at a radial distance therefrom, said line-protecting element being adapted to be mounted on said end wall to bridge the distance between this end wall and said enclosing surface in order, when using the fishing reel, to prevent a line wound on the line spool from being wedged between said end wall and said enclosing surface.

A prior-art line-protecting element of this type consists of a pipe cleaner bent into a ring and placed in a circumferential groove in the end wall of the line spool. This pipe cleaner ring is cheap and exerts but a slight friction when the line spool and the component on which the surface enclosing the end wall is formed, are rotating and/or oscillating axially in relation to each other. However, the pipe cleaner ring suffers from the drawback of being ruined relatively quickly by the action of water and soil and is complicated to exchange.

U.S. Pat. No. 4,058,269 discloses an annular line-protecting element obviating the above-mentioned shortcomings. This known line-protecting element is in the form of a ring of elastic material which is applied to the end wall of the line spool. The ring has a U- or V-shaped cross-section, with the legs of the U or V extending substantially axially. The radially outer leg abuts only with its free end on the enclosing surface, which means that only a slight friction is exerted between the ring and the enclosing surface. This friction is further reduced in that the part of the ring forming the radially outer leg is divided by axial slots into a plurality of flanges distributed along the circumference of the ring. The ring described in U.S. Pat. No. 4,058,269 is however disadvantageous in that the fishing line wound on the line spool, especially if the line has a small diameter (about 0.1-0.2 mm), may become wedged, during the operation of the fishing reel, between the radially outer leg of the ring and the enclosing surface.

This drawback has been overcome in the line-protecting element described in U.S. Pat. No. 4,061,288. This line-protecting element also is in the form of a ring of elastic material and is placed in a circumferential groove in the end wall of the line spool. The ring has an L-shaped cross-section, with one leg engaging the enclosing surface throughout its entire length. As a result, no wedge-shaped gap will exist between the ring and the enclosing surface where the line may become wedged. Since one leg engages the enclosing surface throughout its entire length, there will exist a substantial engagement surface, making the friction between the ring and the enclosing surface relatively high. This is of lesser importance in large-size fishing reels, e.g. reels for deep-sea fishing, but constitutes a considerable drawback in small-size fishing reels, especially in such reels where the line spool and the component on which the surface enclosing the end wall is formed, not only rotate but also oscillate axially in relation to each other.

SUMMARY OF THE INVENTION

The object of the present invention is to provide a line-protecting element in which the above-mentioned drawbacks of the prior-art designs are disposed of, and which thus produces but a small friction from rotation and oscillation and efficiently prevents wedging of the fishing line.

According to the invention, this object is achieved by means of a line-protecting element for use in a fishing reel having a line spool with at least one circular end wall, and a component with a circular-cylindrical surface enclosing said end wall at a radial distance therefrom, said line-protecting element being adapted to be mounted on said end wall to bridge the distance between this end wall and said enclosing surface in order, when using the fishing reel, to prevent a line wound on the line spool from being wedged between said end wall and said enclosing surface, said line-protecting element comprising a ring of low-friction material having substantially radially projecting tongues distributed along the circumference of the ring and so dimensioned as to be easily flexible in the circumferential direction of the ring, but rigid in the axial direction thereof, the outer radius of the ring being smaller than the radius of said enclosing surface, while the radius at the free ends of said tongues is greater than the radius of said enclosing surface.

BRIEF DESCRIPTION OF THE DRAWINGS

The invention will now be described in more detail with reference to the accompanying drawings, in which.

DESCRIPTION OF THE PREFERRED EMBODIMENT

Figure 1:
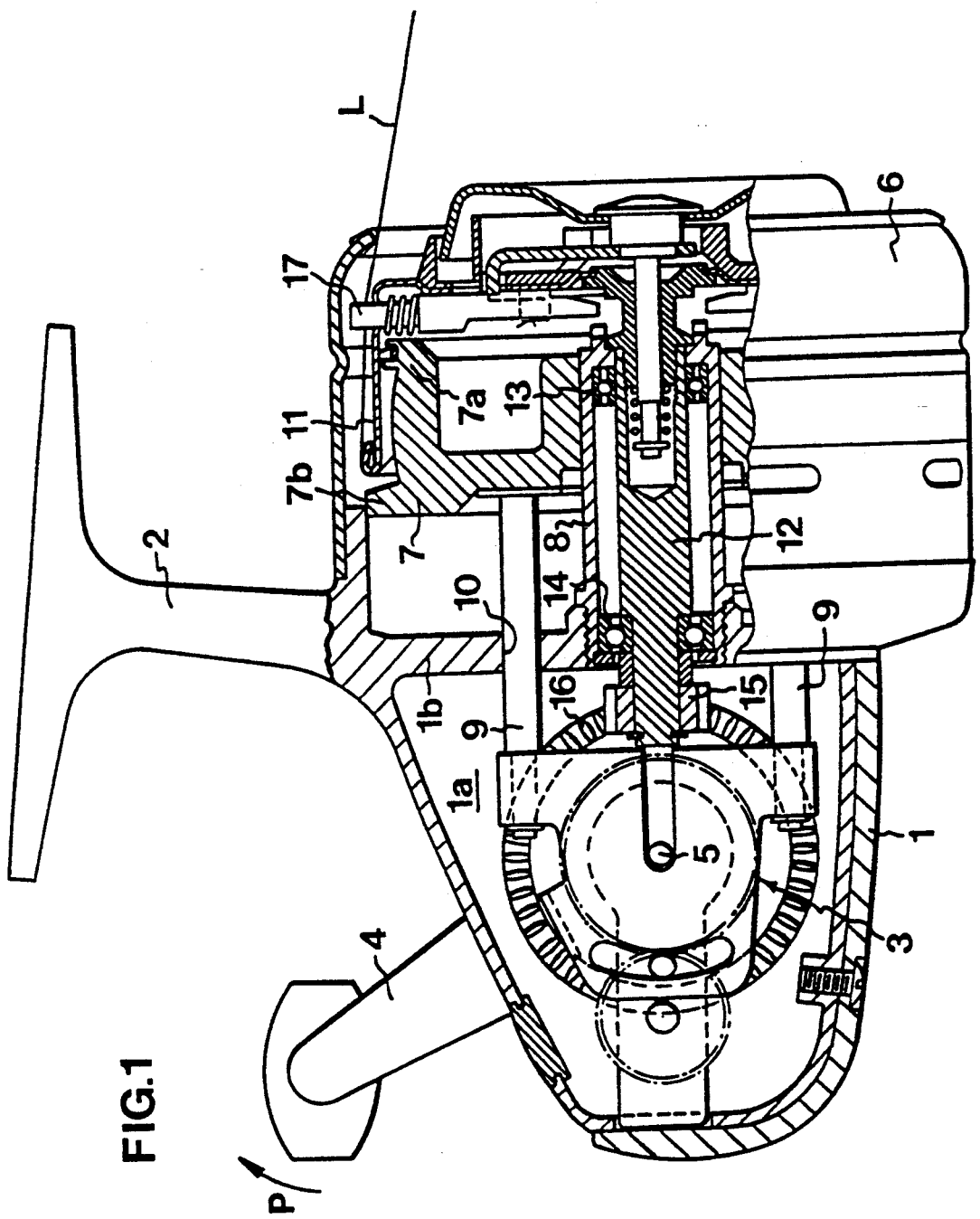
FIG. 1 illustrates a fishing reel provided with a line-protecting element according to the invention.

The fishing reel illustrated in FIG. 1 is a closed-face fixed-spool reel. The reel has a frame 1 and a foot 2 connected thereto for attaching the reel to a fishing rod. An oscillating mechanism 3 is arranged in the frame 1. A handle 4, whose shaft 5 is mounted in one side wall 1a of the frame 1 and extends into the interior thereof, is mounted on the frame for driving the oscillating mechanism 3 when being turned.

A spool housing 6 in the form of an outer cup is fixed to the frame 1 by means of a bayonet catch and defines, together with a front frame wall 1b, a closed space accommodating a line spool 7. The line spool 7 is axially displaceably mounted on a hollow spindle 8 fixedly connected to the frame 1 and extending into the spool housing 6 from the front frame wall 1b. The line spool 7 is connected to the oscillating mechanism 3 by means of two connecting rods 9 extending through holes 10 provided therefor in the front frame wall 1b. By means of the oscillating mechanism 3, the line spool 7 is movable back and forth between a front position (FIG. 1) and a rear position.

A line-winding mechanism 11 in the form of an inner cup is rotatably mounted in the spool housing 6 in front of the line spool 7. The line-winding cup 11 has a center shaft 12 rotatably mounted in the hollow spindle 8 in bearings 13 and 14 and extending some distance into the frame 1. At its end located in the frame 1, the shaft 12 has a gear 15 nonrotatably mounted on the shaft and meshing with a crown wheel 16 nonrotatably connected to the shaft 5 of the handle 4. When turning the handle 4 in the direction indicated by an arrow P, the line-winding cup 11 is rotated for winding a fishing line L on the line spool 7.

Two diametrically opposed, radially directed pick-up pins 17 are arranged in the line-winding cup 11. The pins 17 are radially shiftable between a radially inner position, to which they are moved when a cast is to be made, and a radially outer position (FIG. 1), in which they project outside the cup 11 and to which they are automatically moved as soon as the rotation of the handle 4 in the direction of line retrieve P commences. During the rotation of the handle 4 in the direction P, one of the pick-up pins 17 engages the line L and winds it on the line spool 7 while this is oscillated by the oscillating mechanism 3.

The line spool 7 has a front end wall 7a and a rear end wall 7b and, located therebetween, a portion which has a smaller diameter than the end walls 7a and 7b and on which the fishing line L is wound. When the line spool 7 is in its front position (FIG. 1), its rear end wall 7b is located in the vicinity of the outwardly-forwardly bent free end of the inner cup 11, and when the line spool 7 is in its rear position, its front end wall 7a is located substantially opposite the bent free end of the inner cup 11.

The front end wall 7a of the line spool 7 has two radially projecting, axially spaced-apart flanges 18a and 18b defining between them an annular circumferential groove 19. The rear flange 18b has a larger diameter than the front flange 18a, but a smaller diameter than the circular-cylindrical surface 20 defined by the inner wall of the cup 11.

The line-protecting element according to the invention comprises an elastic ring 21 of low-friction material. The ring 21 consists, for example, of a compression-molded polymer material. The ring 21 shown in FIGS. 2 and 3 has a rectangular cross-section whose height or radial extent slightly exceeds its width or axial extent. The ring 21 has been passed over the front flange 18a and placed in the groove 19 having the same width as the ring 21 (see FIG. 2). The ring 21 then is supported both by the two flanges 18a and 18b and by the bottom of the groove 19.

The ring 21 has substantially radially protruding tongues 22 which are evenly distributed along the circumference of the ring and which, in the illustrated embodiment, have a mutual angular spacing of 30°. The tongues 22 are thin, as seen in the circumferential direction of the ring 21, and therefore are easily bent in this direction. On the other hand, the tongues 22 have, as seen in the axial direction of the ring 21, such a width that they are nonflexible or rigid in this direction.

The outer radius of the ring 21 is smaller than the inner radius of the cup 11, i.e. the radius of the enclosing surface 20, while the radius at the free ends of the tongues 22 slightly exceeds this radius. The tongues 22 will therefore be slightly bent in the circumferential direction (see FIG. 3) when the fishing reel is mounted.

Figure 2:
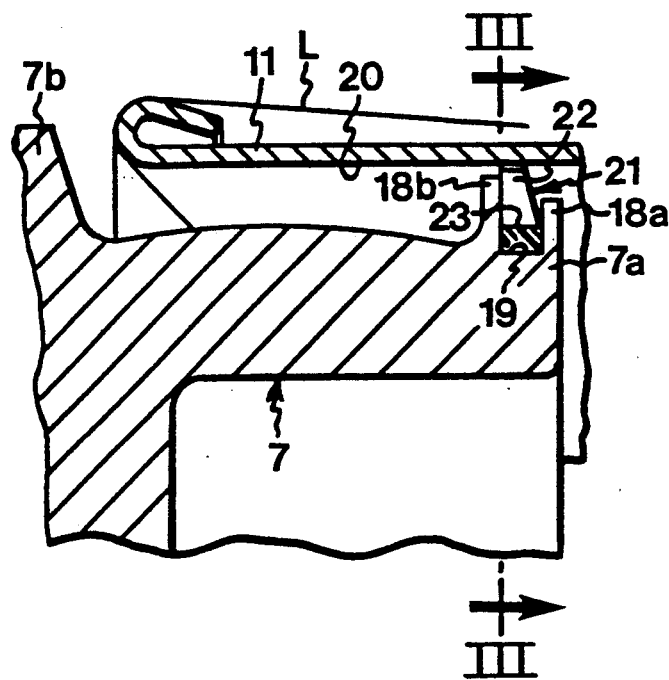
FIG. 2 is a broken-away portion of FIG. 1, showing on a larger scale a cup and a line spool with the line-protecting element according to the invention mounted thereon.
Figure 3:
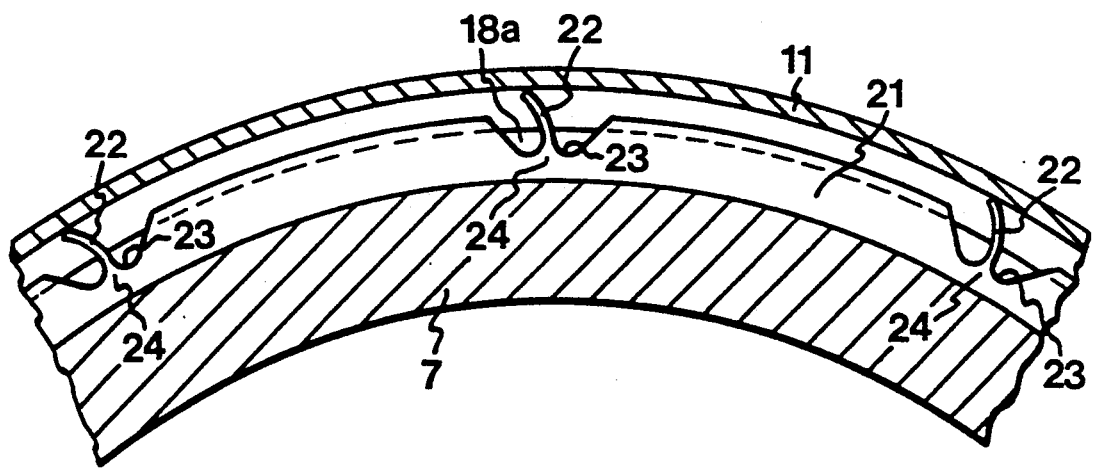
FIG. 3 is a section taken along the line III—III in FIG. 2.

The rear edge of each tongue 22, as seen in the axial direction, is, like the front edge of the rear flange 18b, orthogonal to the axis of the line spool 7 and of the ring 21, these edges engaging each other throughout the entire radial extent of the rear flange 18b (see FIG. 2).

Each tongue 22 protrudes from the bottom of a recess 23 formed at the circumference of the ring 21. As a result, the ring 21 has a plurality of portions 24 having a reduced cross-sectional area and being evenly distributed along the circumference of the ring. By the provision of the portions 24, it becomes easier to mount the ring 21 on the front end wall 7a of the line spool 7, since an elastic deformation takes place in these portions when the ring is passed over the front flange 18a. In that each tongue 22 projects from the bottom of a recess 23, it will have a greater length in the radial direction and, hence, becomes more easily flexible in the circumferential direction. The tongues 22 thus engage the inner wall of the cup 11 with but a slight pressure, which means that only a small friction is exerted between the ring 21 and the surface 20 enclosing the front end wall 7a of the line spool 7 when this and the cup 11 are rotating and oscillating axially in relation to each other. This friction can be further decreased by reducing the engagement surface of the tongues 22. In the illustrated embodiment, this has been achieved by giving the tongues 22 a radially outwardly decreasing width (see FIG. 2).

What I claim and desire to secure by Letters Patent is:

1. A line-protecting element for use in a fishing reel with the fishing reel having a line spool with at least one circular end wall and a circular-cylindrical surface enclosing the end wall at a radial distance therefrom, the line-protecting element comprising
a ring mounted on the end wall having means to bridge the distance between the end wall and the circular-cylindrical enclosing surface with said ring and said bridging means being of a low-friction material;
said bridging means including substantially radially projecting tongues distributed along the circumference of said ring and projecting therefrom;
said projecting tongues being flexible in a circumferential direction of said ring and rigid in an axial direction of said ring;
said ring having an outer radius smaller than the radius of said circular-cylindrical enclosing surface, and the radius of said circular-cylindrical enclosing surface being smaller than a radial reach of free ends of said projecting tongues
whereby said free ends bend against said enclosing surface to prevent a line wound on the line spool from being wedged between said end wall and said enclosing surface.

2. The line-protecting element in accordance with claim 1 wherein
said projecting tongues have a radially outward decreasing width in the axial direction of said ring.

3. The line-protecting element in accordance with claim 1 wherein
said ring has recesses spaced around the circumference of said ring with said recesses forming reduced cross-sectional areas facilitating elastic deformation of said reduced cross-sectional areas.

4. The line-protecting element in accordance with claim 3 wherein
each of said projecting tongues protrudes from a bottom of one of said recesses in the circumference of said ring.

5. The line-protecting element in accordance with claim 1 wherein
each of said projecting tongues protrudes from a bottom of a recess in the circumference of said ring.

* * * * *